United States Patent [19]

Pike, Jr.

[11] Patent Number: 5,518,747
[45] Date of Patent: May 21, 1996

[54] PROCESS OF PRESERVING VEGETABLES

[75] Inventor: Edward F. Pike, Jr., Camarillo, Calif.

[73] Assignee: SNG Spice Products, Inc., Camarillo, Calif.

[21] Appl. No.: 327,402

[22] Filed: Oct. 21, 1994

[51] Int. Cl.⁶ .................. A23L 3/3418; A23L 3/3427; A23L 3/3463; A23L 3/3589
[52] U.S. Cl. .................. 426/335; 426/321; 426/615; 426/626; 426/327
[58] Field of Search .................. 426/335, 321, 426/615, 626, 327

[56] References Cited

U.S. PATENT DOCUMENTS

| | | | |
|---|---|---|---|
| 3,843,870 | 10/1974 | Fehmerling | 426/615 |
| 5,057,330 | 10/1991 | Lee et al. | 426/120 |
| 5,230,221 | 7/1993 | Delich | 62/100 |

OTHER PUBLICATIONS

Desrosier The Technology of Food Preservation 3rd Edition, The AVI Publishers, Inc. Westport, Conn. (1970) pp. 239–267.

Webster's II New Riverside University Dictionary p. 889 (1984) Houghton Mifflin Co.

Primary Examiner—Esther M. Kepplinger
Assistant Examiner—Choon P. Koh
Attorney, Agent, or Firm—Jack C. Munro

[57] ABSTRACT

The process of preserving a quantity of diced vegetables which combines a given quantity of the vegetables with a preselected amount of water (including ice) and acid such as citric acid. The amount of acid is equal to approximately five percent of the amount of water by weight. The vegetables, water and acid are thoroughly mixed together producing a slurry. This slurry is located within a mixing chamber with a vacuum being drawn on that mixing chamber to between twenty five and twenty nine inches of mercury. The mixing chamber is moved to achieve an intermixing between the ingredients for a preestablished period of time generally in the range of ten minutes to forty five minutes. The ingredients are then removed from the mixing chamber with the liquid removed from the vegetables then placed within containers for shipment and refrigerated.

6 Claims, 1 Drawing Sheet

PROCESS OF PRESERVING VEGETABLES

BACKGROUND OF THE INVENTION

1. Field of the Invention

The field of this invention relates to processes for preserving vegetables and more particularly to a process that significantly lowers the pH of vegetables which not only preserves the vegetables but also substantially eliminates the possibility of botulism in the utilization of the vegetables.

2. Description of the Prior Art

Vegetables are commonly sold in grocery stores in both the fresh state and the frozen state. The freezing of the vegetables functions to preserve the vegetables substantially extending their shelf life. Fresh vegetables have a very short shelf life.

When utilizing vegetables as an ingredient in other foods, such as for example spaghetti sauces, in order to enhance flavor it is desired to use substantially fresh vegetables. For maximum flavor it would be necessary to use the vegetables within two to three days of harvesting when making of the sauce. However, in a large scale manufacturing facility, this short time period is just not possible. It would be desirable to be able to utilize refrigerated vegetables for up to one or two weeks from harvest where the vegetables have the same characteristics as fresh vegetables.

Additionally, when dealing with manufacturing of food sauces, botulism is a significant problem. Botulism is a type of food poisoning ingested by humans produced by the anaerobic bacteria *Clostridium botulinum* and *Clostridium parabotulinum*. Prevention of botulism is best accomplished by safe procedures of food preservation.

The disease in humans most commonly follows ingestion of unheated, improperly processed food, with a pH above 4.5, in which growth and toxin production has occurred. It is characterized by respiratory failure. In humans an acute gastroenteritis may or may not precede the principle symptoms of extreme weakness, dry mucosa, loss of accommodation, ocular muscle paralysis and difficulty in swallowing.

It is desirable that when using vegetables as ingredients within prepared foods that the vegetables have a pH of less than 4.5 thereby eliminating the possibility of the creation of botulism.

SUMMARY OF THE INVENTION

The process of preserving vegetables of the present invention comprises utilizing a mixing chamber and supplying into that mixing chamber a quantity of vegetables which have been diced to be no greater in size than one-half inch cubes. Also supplied into the mixing chamber is a quantity of a liquid where this liquid contains a small percentage (four to five percent) of an acid selected from the group consisting of citric, ascorbic, lactic, malic and acetic. The quantity of liquid is generally between one and 1½ times by weight of the quantity of the vegetables. The liquid includes between 15% and 20% by weight of crushed ice. The mixing chamber is then placed under a vacuum approaching twenty nine inches of mercury. This vacuum is maintained on the mixing chamber for a preselected period of time based on the type of vegetable that is included within the mixing chamber. The vegetables and liquid are constantly mixing during this period of time with generally this mixing occurring by rotation of the mixing chamber. Upon the preselected time expiring, the mixing chamber is opened to the ambient and the slurry therein removed with the slurry then being subjected to an air blower in order to remove the liquid leaving only the vegetables. The vegetables are then placed in containers and refrigerated for shipment. The liquid includes between 15% and 20% by weight of crushed ice.

The primary objective of the present invention is to achieve a process of preserving vegetables which will substantially increase the shelf life of the vegetables which causes the vegetables to retain their freshness over an extended period of time such as up to two to three weeks.

Another objective of the present invention is to produce a process of preserving vegetables which substantially eliminates the creation of botulism when using of the vegetables as ingredients within other foods.

BRIEF DESCRIPTION OF THE DRAWING

The figure.

DETAILED DESCRIPTION OF THE PREFERRED EMBODIMENT

Figure 1:
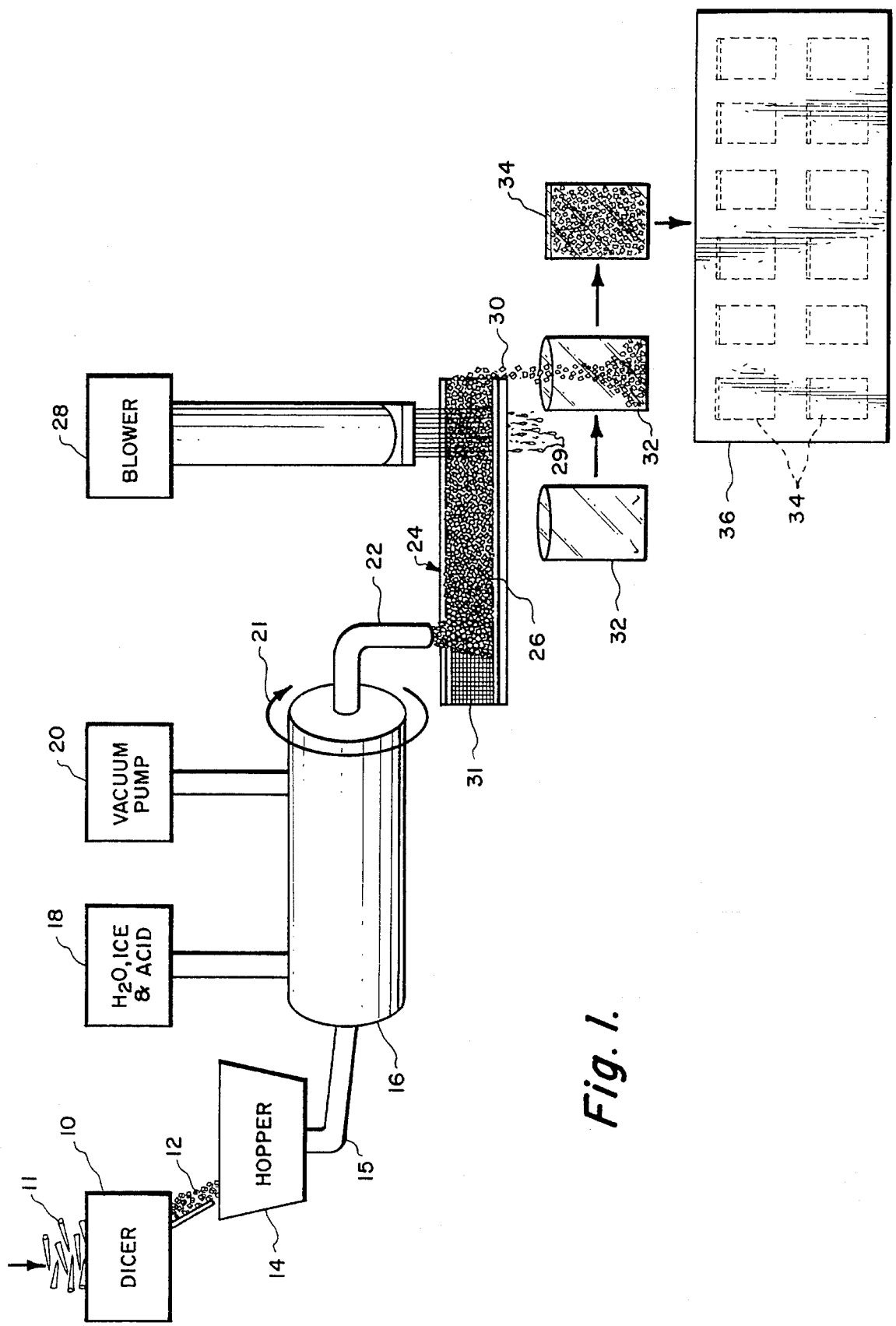
FIG. 1, shows the entire process of preserving vegetables of the present invention.

Referring particularly to the drawing, a raw vegetable 11 such as onion, celery, zucchini, bell peppers and carrots are to be placed within a dicer 10. Only one vegetable is to be preserved at a time. As far as the process of this invention, it is generally desirable that the vegetable have a reasonably constant density. Therefore, vegetables, such as previously mentioned, plus vegetables such as potatoes, turnips and squash make good candidates for the process of the present invention. However, vegetables that do not have a constant density such as tomatoes, broccoli and cauliflower may not be good candidates for the process of the present invention.

The diced vegetables 12 are dispensed from the dicer 10 which produces small particles of the vegetable no greater than one-half inch cubes. A typical size would be about ⅜ inch cube sections of the vegetables. The diced vegetables 12 are then deposited with a hopper 14. From the hopper 14 the diced vegetables are dispensed through chute 15 into a mixing chamber in the form of a tumbler 16. Within the mixing chamber there is then added a quantity of water, ice and acid. A typical acid would be citric. However, it is envisioned that other acids could be used such as ascorbic, lactic, malic and acetic. The ice should be crushed so that it is composed of small particles which can readily melt. The water, ice and acid is supplied from a reservoir 18.

The tumbler 16 will then be rotated indicated by arrow 21 by a mechanism (not shown). During this rotation a vacuum is applied within the internal chamber of the tumbler 16 by a vacuum pump 20. The amount of vacuum is significant and will generally be greater than twenty five inches of mercury and will be in the range of twenty nine inches of mercury which means about ninety seven percent of the atmosphere within the tumbler 16 has been removed. This vacuum is maintained for a preselected period of time based on the type of vegetable that is placed within the tumbler 16. The vacuum causes the acid to readily penetrate the vegetable.

After the preselected period of time is expired, the vegetables and liquid forming a slurry 26 are then dispensed through chute 22 onto a conveyor belt 24. The conveyor belt 24 moves the vegetable slurry 26 in contact with a flow of air from an air blower 28. It is the function of the air from the air blower 28 to remove the liquid from the slurry 26 leaving only the vegetables 30. The water 29 of the slurry 26 passes through the screen 31 of the conveyor belt 24. The distinction between the vegetables 30 and the vegetables 12 is that the vegetables 30 have substantially absorbed the acid contained within the slurry within the tumbler 16. Also the vegetables 30 are at a substantially decreased temperature, approximately forty degrees Fahrenheit, where the vegetables 12 are at ambient room temperature which would normally be between sixty degrees and ninety degrees Fahrenheit.

The vegetables 30 are then placed within containers such as plastic bags 32. Typically these plastic bags 32 will hold forty pounds of the vegetables 30. The plastic bag 32 is then sealed as is shown by bag 34 with the bag 34 then being placed within a refrigerator 36. From the refrigerator 36 the bagged vegetables will be shipped to appropriate dispensing locations.

When the vegetables 30 first exit from the conveyor belt 26, the outer surface of the vegetables 30 will have a pH in the range of three with the center of the vegetables having a pH of around four. After about twelve hours within the refrigerated environment of refrigerator 36, the pH of the vegetables will become constant at around 3.5. If onions are the vegetable that is used, the quantity of the onions being used should about 2700 pounds. The quantity by weight of the liquid being placed within the tumbler 16 would be about 1¼ times the 2700 pounds which would equal 3350 pounds. Included within this liquid is about four percent of citric acid which is about 134 pounds and 660 pounds of crushed ice. If the diced onions are generally particles about one-half inch in cube, the amount of time that the onions are located within the tumbler 16 would be in the range of thirteen minutes once the full vacuum is drawn within the tumbler 16. Generally it takes between four to eight minutes to draw a full vacuum. If the particles of the onions constitute ⅜ inch cubes, the onions need only remain in the tumbler 16 for a period of ten minutes after drawing a full vacuum.

If the vegetable used is carrots, and the particles of the carrots are again in the range of ⅜ inch cube, there is to be supplied 2500 pounds of the carrots into the tumbler 16 with about 3750 pounds of liquid. The amount of acid is five percent which means that the liquid includes about 188 pounds of acid, as well as 660 pounds of crushed ice. The liquid that is being supplied into the tumbler 16 is close to freezing, that is at 32 degrees Fahrenheit. The slurry 26 that comes out from the tumbler 16 will be at approximately forty to forty one degrees Fahrenheit. The pH of the carrots when they are dispensed from the tumbler 16 is 3.8 in the center of the carrot and about 3.2 on the outside of the carrot. After about twelve hours in the refrigerator 36, the pH is constant in the range of about 3.4 to 3.6. The carrots will actually absorb about 66 percent or 100 pounds of the citric acid.

The colder the vegetables, the longer the shelf life and that is why the vegetables are iced during tumbling in tumbler 16 and immediately refrigerated after being placed within the containers 32.

For vegetables such as zucchini, it generally takes about thirty five minutes within the tumbler 16. For bell peppers, the time period is approximately eighteen minutes. Again, the amount of citric acid will be between four percent and five percent for both of these vegetables and also the quantity of liquid being supplied in conjunction with the vegetables will also be approximately the same.

What is claimed is:

1. The process of preserving vegetables comprising:

utilizing a mixing chamber;

supplying into said mixing chamber a first quantity of a vegetable which has been diced into particles not larger than one-half inch cubes;

supplying into said mixing chamber a second quantity of a liquid where said liquid includes a third quantity of an acid where the amount by weight of said acid to said liquid comprises approximately five percent;

closing to the ambient said mixing chamber;

drawing a vacuum within the range of twenty five inches of mercury to twenty nine inches of mercury within said mixing chamber;

tumbling of the ingredients composed of said first and said second and said third quantities within said mixing chamber;

maintaining said tumbling step and said drawing step for a preestablished period of time until said third quantity is entirely absorbed by said first quantity and the pH of said first quantity has been lowered to between three and four;

eliminating of said vacuum;

dispensing of said first and second quantity from said mixing chamber; and removing said second quantity from said first quantity.

2. The process of preserving vegetables as defined in claim 1 wherein:

within the second supplying step the second quantity includes an amount of crushed ice.

3. The process of preserving vegetables as defined in claim 1 wherein:

the amount of said second and third quantities when compared to said first quantity is between 100% and 150% of the weight of said first quantity.

4. The process of preserving vegetables as defined in claim 1 wherein:

the acid is selected from the group consisting of citric, ascorbic, lactic, malic and acetic.

5. The process of preserving vegetables as defined in claim 1 wherein:

said preestablished period of time within said maintaining step is within the range of ten minutes to forty five minutes.

6. The process of preserving vegetables as defined in claim 1 wherein:

said removing step comprises blowing air across said first quantity and said second quantity.

* * * * *